US012718028B2

(12) United States Patent
Phu et al.

(10) Patent No.: US 12,718,028 B2
(45) Date of Patent: Aug. 25, 2026

(54) CONVERSATION TOPIC AND SUMMARY EXTRACTION FOR REAL-TIME MESSAGING PLATFORMS

(71) Applicant: Discord Inc., San Francisco, CA (US)

(72) Inventors: Shannon Kate Phu, Sunnyvale, CA (US); Christopher Ramesh, San Francisco, CA (US)

(73) Assignee: DISCORD INC., San Francisco, CA (US)

( * ) Notice: Subject to any disclaimer, the term of this patent is extended or adjusted under 35 U.S.C. 154(b) by 248 days.

(21) Appl. No.: 18/366,732

(22) Filed: Aug. 8, 2023

(65) Prior Publication Data

US 2025/0053749 A1 Feb. 13, 2025

(51) Int. Cl.

| | |
|---|---|
| ***G06F 40/35*** | (2020.01) |
| ***G06F 16/34*** | (2019.01) |
| ***H04L 51/04*** | (2022.01) |
| ***H04L 51/216*** | (2022.01) |
| ***H04L 51/224*** | (2022.01) |

(52) U.S. Cl.

CPC ............ *G06F 40/35* (2020.01); *G06F 16/345* (2019.01); *H04L 51/04* (2013.01); *H04L 51/216* (2022.05); *H04L 51/224* (2022.05)

(58) Field of Classification Search

None

See application file for complete search history.

(56) References Cited

U.S. PATENT DOCUMENTS

| | | | | |
|---|---|---|---|---|
| 10,708,216 | B1 * | 7/2020 | Rao | G06Q 10/40 |
| 10,916,241 | B1 * | 2/2021 | Edwards | G10L 15/22 |
| 11,783,112 | B1 * | 10/2023 | Fan | G06F 16/345 715/234 |
| 2017/0351385 | A1 * | 12/2017 | Ertmann | H04L 51/52 |
| 2020/0356629 | A1 * | 11/2020 | Tan | G06F 40/289 |
| 2021/0241162 | A1 * | 8/2021 | Asadorian | G06F 16/285 |
| 2021/0256084 | A1 * | 8/2021 | Marsh | G06F 16/9535 |
| 2022/0021636 | A1 * | 1/2022 | Wayne | H04L 51/02 |
| 2022/0150301 | A1 * | 5/2022 | Walters | H04L 67/1001 |
| 2022/0247700 | A1 * | 8/2022 | Bhardwaj | G06N 3/09 |
| 2023/0412549 | A1 * | 12/2023 | Lee | G06Q 10/107 |
| 2024/0037126 | A1 * | 2/2024 | Allouche | G06F 40/30 |
| 2024/0127002 | A1 * | 4/2024 | Newman | G06F 40/20 |
| 2024/0179193 | A1 * | 5/2024 | Maurer | G06N 3/08 |
| 2024/0202443 | A1 * | 6/2024 | Yaghi | G06N 3/08 |
| 2024/0354713 | A1 * | 10/2024 | Sim | G06Q 10/107 |
| 2025/0005467 | A1 * | 1/2025 | Stephens | G06Q 10/063112 |
| 2025/0045535 | A1 * | 2/2025 | Kumar | G06F 40/40 |

* cited by examiner

*Primary Examiner* — Paras D Shah
*Assistant Examiner* — Ali M Hassan
(74) *Attorney, Agent, or Firm* — Polsinelli PC

(57) ABSTRACT

The present technology provides real-time topic extraction and summarization technology for communications channels and messaging platforms. The topics are extracted using a language model that extracts topics from chat log data. A topic that is selected causes the conversation panel to jump to the start of the conversation associated with the selected topic. The messages that are associated with the selected topic are highlighted or segregated from the rest of the messages. The selection of the topic and other types of engagement with topics are stored to build up a database that is used for generating a personalized ranking of topics for respective users. The quality of the topics is scored using a different language model.

18 Claims, 7 Drawing Sheets

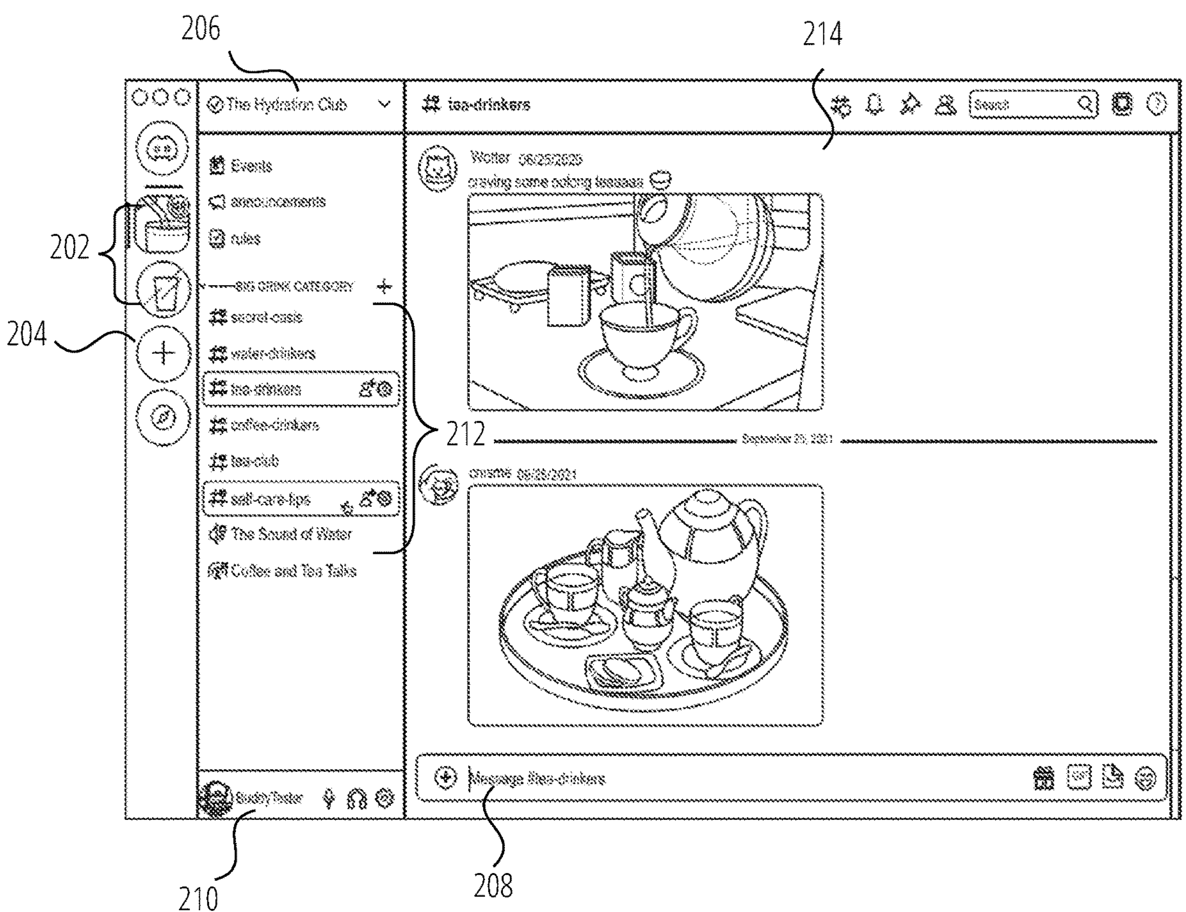
FIG. 2A

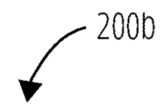
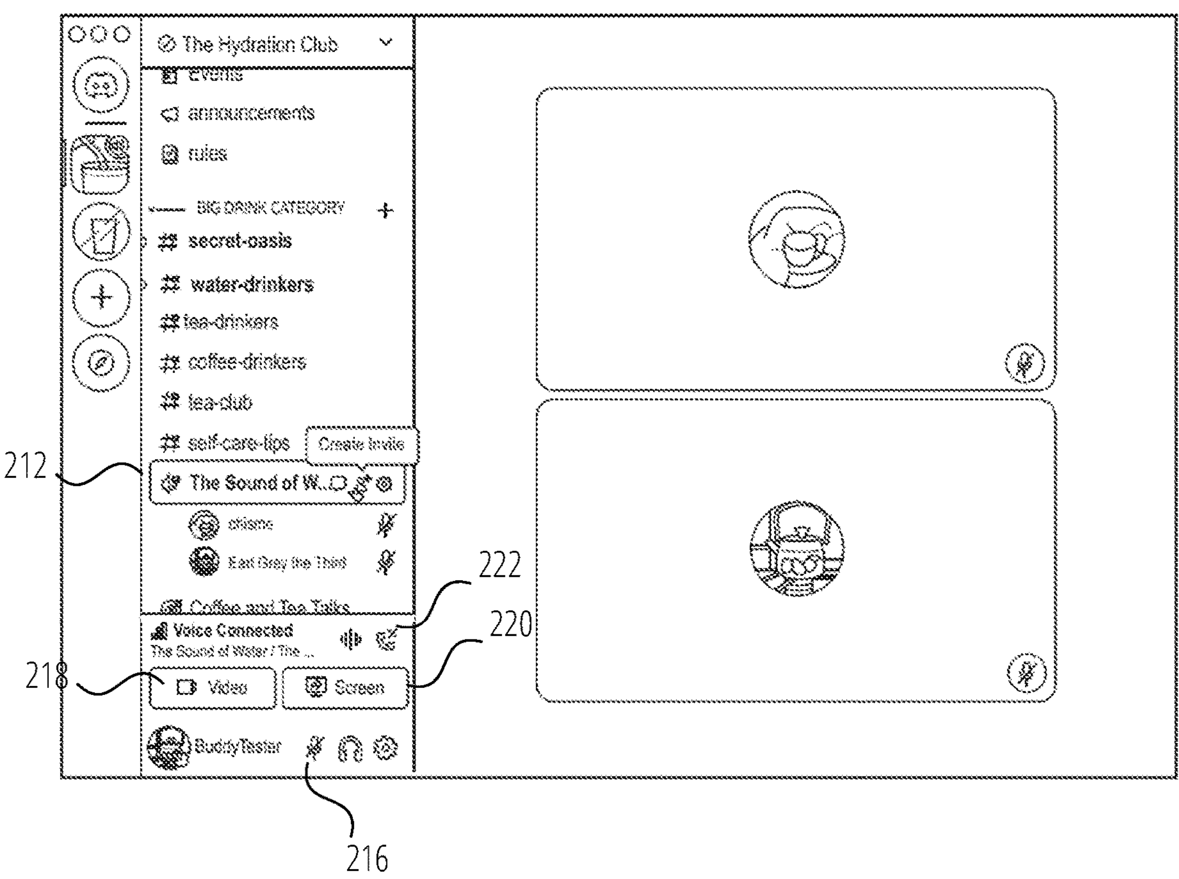
FIG. 2B

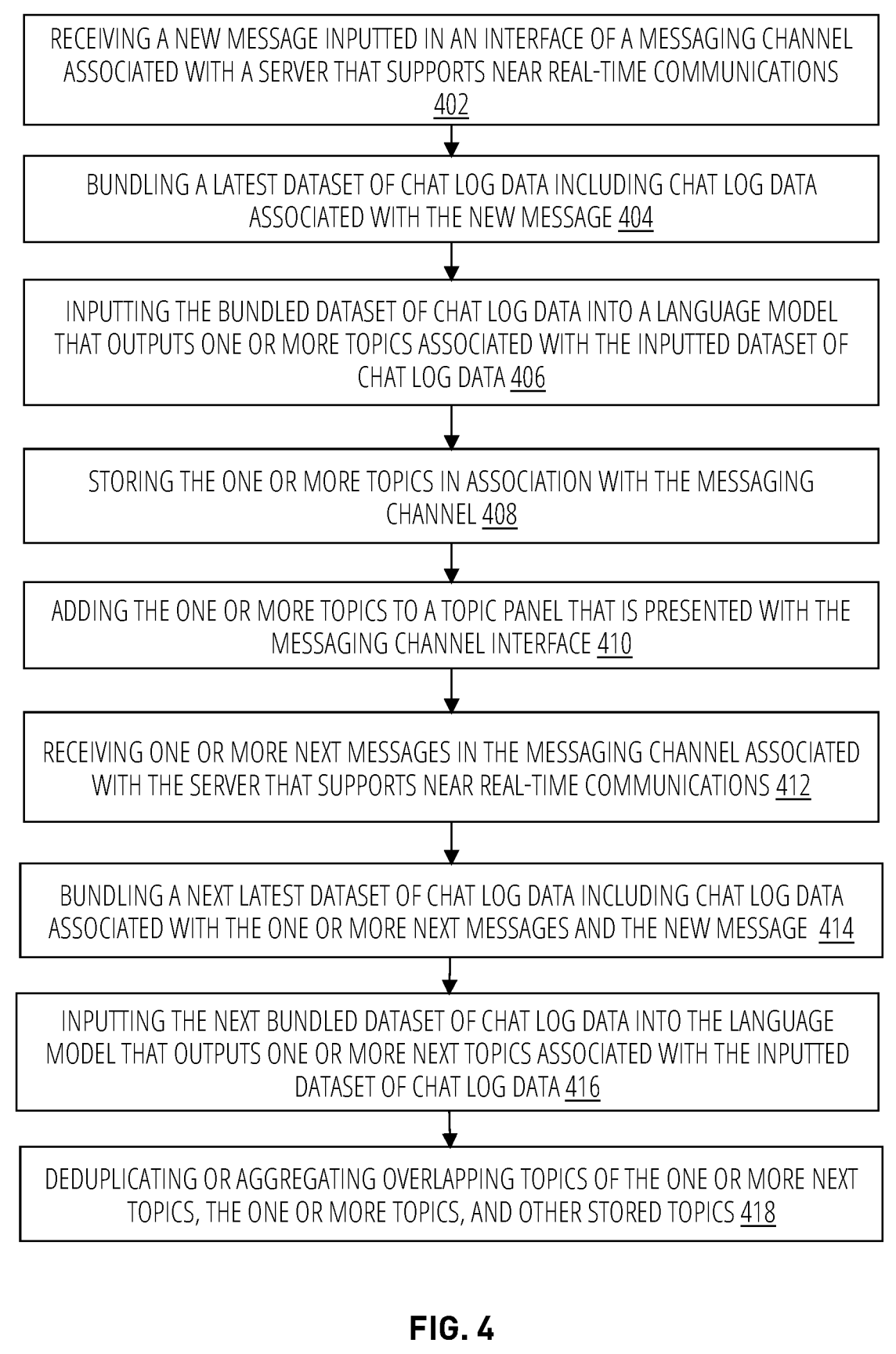

RECEIVING A NEW MESSAGE INPUTTED IN AN INTERFACE OF A MESSAGING CHANNEL ASSOCIATED WITH A SERVER THAT SUPPORTS NEAR REAL-TIME COMMUNICATIONS 402

BUNDLING A LATEST DATASET OF CHAT LOG DATA INCLUDING CHAT LOG DATA ASSOCIATED WITH THE NEW MESSAGE 404

INPUTTING THE BUNDLED DATASET OF CHAT LOG DATA INTO A LANGUAGE MODEL THAT OUTPUTS ONE OR MORE TOPICS ASSOCIATED WITH THE INPUTTED DATASET OF CHAT LOG DATA 406

STORING THE ONE OR MORE TOPICS IN ASSOCIATION WITH THE MESSAGING CHANNEL 408

ADDING THE ONE OR MORE TOPICS TO A TOPIC PANEL THAT IS PRESENTED WITH THE MESSAGING CHANNEL INTERFACE 410

RECEIVING ONE OR MORE NEXT MESSAGES IN THE MESSAGING CHANNEL ASSOCIATED WITH THE SERVER THAT SUPPORTS NEAR REAL-TIME COMMUNICATIONS 412

BUNDLING A NEXT LATEST DATASET OF CHAT LOG DATA INCLUDING CHAT LOG DATA ASSOCIATED WITH THE ONE OR MORE NEXT MESSAGES AND THE NEW MESSAGE 414

INPUTTING THE NEXT BUNDLED DATASET OF CHAT LOG DATA INTO THE LANGUAGE MODEL THAT OUTPUTS ONE OR MORE NEXT TOPICS ASSOCIATED WITH THE INPUTTED DATASET OF CHAT LOG DATA 416

DEDUPLICATING OR AGGREGATING OVERLAPPING TOPICS OF THE ONE OR MORE NEXT TOPICS, THE ONE OR MORE TOPICS, AND OTHER STORED TOPICS 418

FIG. 4

CONVERSATION TOPIC AND SUMMARY EXTRACTION FOR REAL-TIME MESSAGING PLATFORMS

BACKGROUND

Some social networks are developed around friendships, professional relationships, or other individual connections, and some social networks create communities around common interests. Often social networking platforms provide services through which users can form or interact within a social network. While social networks can provide entertainment, networking, commercial, or informational value, they are also subject to various challenges. For larger or very active communities, communications between some members in a channel may result in an overwhelming amount of missed messages for other members. The burden to read all the missed messages to catch up may result in those other members becoming less engaged with the social networking platform.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 2A illustrates an example of a user interface presented by a client application in accordance with some aspects of the present technology.

FIG. 2B illustrates an example of a user interface presented by a client application in accordance with some aspects of the present technology.

FIG. 4 illustrates an example flowchart diagram for generating topics based on chat log data in accordance with some aspects of the present technology.

DETAILED DESCRIPTION

Figure 1:
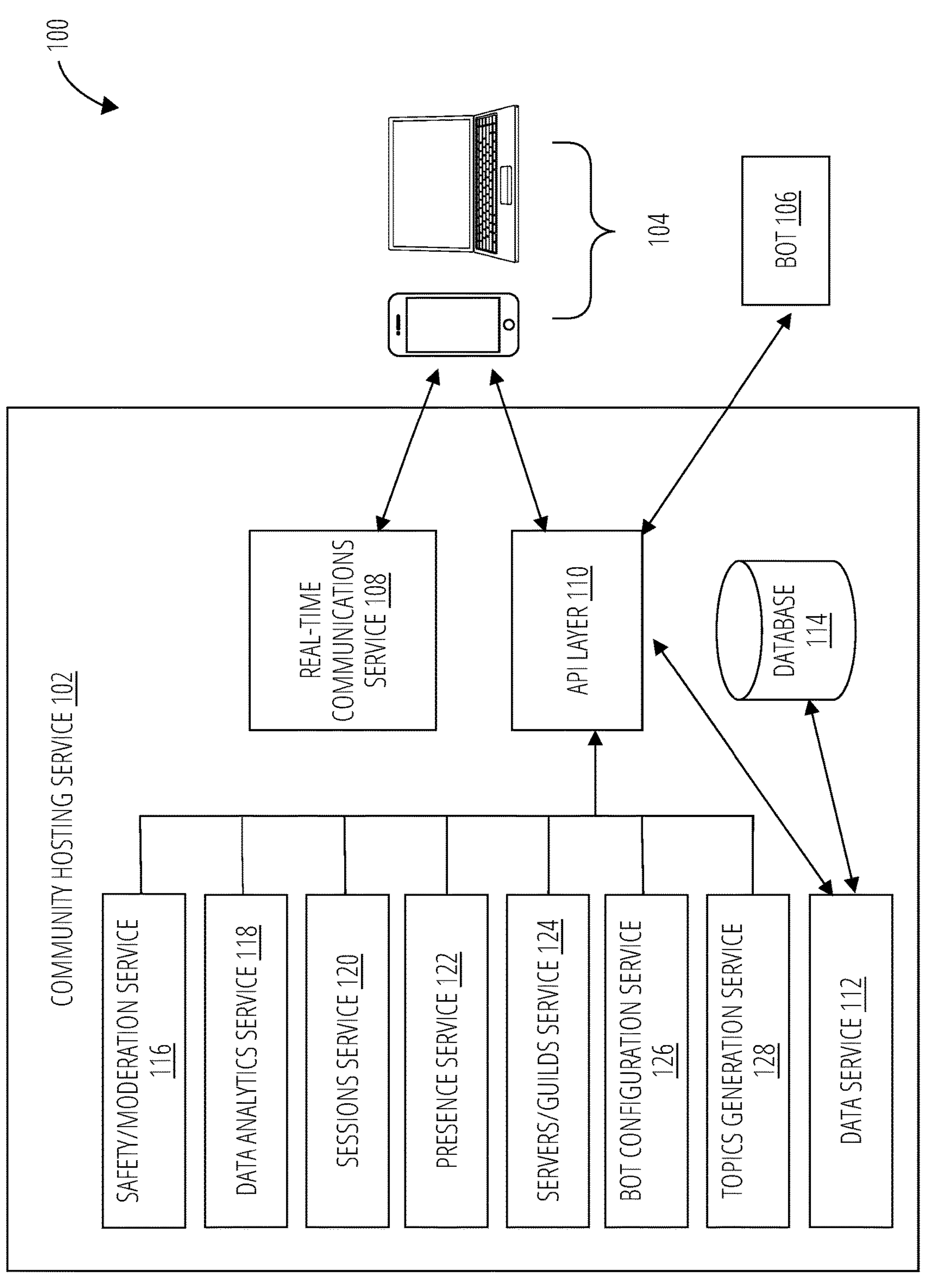
FIG. 1 illustrates an example system configured to support user accounts in creating, managing and participating in online communities in accordance with some aspects of the present technology.

Various embodiments of the disclosure are discussed in detail below. While specific implementations are discussed, it should be understood that this is for illustration purposes only. A person skilled in the relevant art will recognize that other components and configurations may be used without parting from the spirit and scope of the disclosure.

Additional features and advantages of the disclosure will be set forth in the description which follows, and in part, will be obvious from the description or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by practicing the principles set forth herein.

Messaging in a real-time communication channel comes with lots of benefits. Users can have a live conversation that is transcribed for others to view in real time or later. However, when many conversations have passed, for users that have missed those conversations, being caught up may be too much of a burden and feel too overwhelming. This may result in some users being less likely to engage or be active on such a social networking platform. A similar problem may extend to other types of platforms, like messaging-based platforms such as instant messaging or email.

For a variety of different types of message-based platforms where conversation data is stored and there are users that may miss conversations, providing a summary of topics of the various conversations that have occurred may help encourage users to be more active in the respective channels or group conversations.

The topics and associated summaries may be generated by using a language model, such as generative or autoregressive language models, that performs abstractive generation of the topics and summaries from chat log data. The chat log data may first need to be cleaned up to remove personally identifiable information and messy chatter-like language. The chat log data may also have non-readable metadata, such as those associated with usernames, images, and URLs, that need to be formatted to generate conversation data. The conversation data may then be segmented into bundles of messages that are inputted into the language model.

The segmented bundles of messages may be segment on a rolling basis, with overlapping portions of chat log data in each segmented bundle. The rolling basis or a sliding window of bundles of messages may help extract topics that span over different parts of the chat log data. For example, if a first segmented bundle includes a first fifty messages, a new topic may start at the last three messages and span into the first ten messages of the next fifty messages and require all thirteen messages to formulate an accurate topic. Therefore, the sliding window may capture fifty messages every ten messages or so, as an example.

However, in order to build a low latency and high-quality system for the real-time topic and summary extraction, with new incoming messages having overlapping topics, there needs to be a means to deduplicated or aggregated to give a smooth user experience. For example, a user's home page should be shown minimal duplicated topics as chat is being processed in real-time. As such, topics may be generated based on a sliding window of bundles of messages while prompt-based models may be used to filter out duplicates or perform a high-level clustering of similar sounding topics.

In some cases, the segmented bundles may include the same number of messages as those used in a training sample for training a language model to receive chat log data. For example, continuing the example above, segmented bundles of fifty messages may train the language model that later receives segmented bundles of fifty messages as chat log data inputs. The language model may be trained by labeled training data that may be generated from other prompt-based models. Furthermore, the outputted topics and summaries from the language model may be evaluated based on other prompt-based models as well.

In some cases, the language model may output, along with the topics, respective summaries and message identifiers that indicate which messages are associated with the respective topic. The message identifiers may be used to highlight the messages associated with the topic. In some cases, the topics may be selectable and when selected, at the messaging channel interface, the messages may jump or scroll to a starting message associated with the selected topic. The messages that are associated with the topic may be highlighted by any means, e.g., highlighting, bolding, adding a line to the side of the message, or any other type of indication that differentiates the messages associated with the topic from other messages.

In some cases, in addition to the one or more topics, respective summaries that provide slightly more detail than the topics as to what the associated conversations are discussing may also be provided. The topics and summaries may also be stored in association with the user accounts that select the topics. For example, when a user selects the topics, a history of how the user interacts with the topics may be saved. In other words, which topics users are engaged in may be saved into a database to generate personalization data, such as a personalized ranking of topics for respective users. For example, when a user selects a topic or does not select certain topics that were provided in a push notification, such engagement is used to update a personalization ranking of topics. The personalization ranking of topics may first be based on which messaging channels the users are members of but may further be fine-tuned based on user engagement with the topics.

The personalization ranking of topics may further help provide personalization for suggesting new content. For example, a personalized push notification may be provided to a user based on personalized signals. Personalized signals may include a notification response history or a topic affinity. For example, if the user is likely to respond to push notifications, the user may be provided with more push notifications and if the user has a topic of interest based on their history of searches or channel membership, all such signals may be used to generate a personalized push notification.

The one or more topics presented in the topics panel may be associated with the respective messaging channel. In some cases, when viewing a home page associated with the server that supports near real-time communications, a global set of topics associated with the channels that user is a member of may be visible, either in the topic panel or elsewhere on the page. In some cases, the global set of topics may include trending topics for other channels that the user is not a member of but could find interesting based on the personalization data.

A model-based metric may use a different prompt-based language model to score the quality of the results. In some cases, the topic, associated summary, and message identifiers may be provided to a different prompt-based language model along with a baseline set of a topic, an associated summary, and message identifiers generated from inputting the bundled dataset of chat log data at the different prompt-based language model or another prompt-based language model. The different prompt-based language model may be prompted to output a rating of the topic, associated summary, and message identifiers based on the baseline set. The rating may be an aggregate of specific ratings, such as a coherence rating, an accuracy rate, a rating for each message identifier regarding whether the respective message is discussing the topic, etc.

As such, the disclosed technology addresses the need for a real-time topic and summary extraction for real-time communications channels and messaging platforms. Users may be given an option to jump to a specific conversation that they are interested in and browse the different conversations based on topics. In some cases, the messages that are associated with the selected topic may be highlighted or segregated from the rest of the messages. The topics and summaries may be provided in the same or different interface as a conversation panel that presents the conversations.

Furthermore, users' interactions with the topics may also be used to further personalize information that is present to the users, whether it is topics shown to the user from messaging channels that the users are a part of or recommendations for new topics and messaging channels that the users are not a part of as a way to discover new content. The selection of the topic and other types of engagement with topics may be stored to build up a database that is used for generating a personalized ranking of topics for respective users. The personalized ranking may further be used for other types of personalization. For example, if a user selects topics associated with AI imaging, the user may be recommended specific messaging channels that are dedicated to discussing AI or AI imaging. Similarly, if the user never selects topics associated with travel, topics associated with travel may eventually be removed as an option that is presented to the user. In addition, personalized summaries may be used in personalized notifications, home pages, and activity feeds, and as additional context on search results or chat insights as well.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as data collection and/or use changes.

Although the present disclosure broadly covers the use of personal information data to implement one or more various disclosed embodiments, the present disclosure also contemplates that the various embodiments can also be implemented without the need for accessing such personal information data. The various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

FIG. 1 illustrates an example system 100 configured to support user accounts in creating, managing and participating in online communities. In particular, the system 100 supports a plurality of user accounts interacting with each other in communities to which they belong.

The system 100 illustrates an example architecture in which users of user accounts interact through an instance of client application 104 operating on a computing device. The client application 104 can be provided by a webpage rendered in a web browser or a downloaded client application executed by an operating system of the computing device. In some embodiments, some disparate collections of features or functionality might be available in client application 104 depending on the capabilities of the environment executing or rendering the client application 104.

The system 100 also includes a community hosting service 102, which provides an infrastructure for supporting the plurality of user accounts interacting with each other in communities to which they belong. The community hosting service 102 can be a distributed service hosted in a cloud computing architecture. The community hosting service 102 is responsible for hosting various services accessible to the user accounts by the client application 104.

In some embodiments, the community hosting service 102 provides a servers/guilds service 124 to enable user accounts to set up a server (also referred to as a guild) to host members interacting around one or more channels. A server (or guild) is a user-created environment supporting a community. A server is generally configured with one or more channels which are generally created around topics or sub-topics, or groups of people, and can support exchanges of communications between user accounts. Some channels are non-real-time channels where users communicate through written messages, images, emojis, recorded voice or video files, attachments, etc. Some channels are real-time communications channels that support voice or video communications. Some channels may be able to support both non-real-time messaging and real-time communications.

A user account can operate their instance of the client application 104 to create a server at the community hosting service 102. In some embodiments, this will be performed by the client application 104 calling the API layer 110 requesting to create a new server. The API layer 110 can then interact with servers/guilds service 124 to create the server by providing the server with a unique identifier and associating various configurations requested by the user account. Once the server is created, the user account that created the server can be considered the owner and/or admin for the server. The servers/guilds service 124 can record the information about the server using data service 112 to store information about the server in database 114.

In some embodiments, servers can be configured to be public or private. A public server is one that any user can search for and request to join. A private server is one that a user needs to be invited to join. Depending on the configuration of the private server, a user can be invited by another user or may need to be invited by the administrator of the private server. Users can request to join a public or private server, and an entity with administrative privileges can grant the request.

In some embodiments, servers can be managed by the user account that created the server. Additionally, server administrators can delegate privileges to other user accounts to be administrators, and administrators can also create or invite bot 106, such as a chatbot, to perform some administrative actions.

In addition to approving user accounts to join a server, administrators can also set up various safety or content moderation policies. In some embodiments, those policies are enforced by user accounts with the administrator role for the server. In some embodiments, the policies can be enforced by software services provided by the community hosting service 102, such as the safety/moderation service 116 or bot 106.

As introduced above, servers are environments for supporting a community and are generally created around topics. In furtherance of that function, servers can be configured to integrate content through embedded channels or webhooks. For example, an administrator of a server might integrate a YOUTUBE channel, a TWITCH feed, or a TWITTER feed into one or more channels of the server when the content of those channels or feeds are relevant to the channel. In some embodiments, a server can follow a channel offered by another server supported by the community hosting service 102.

In addition to hosts, user accounts that are members of a server can also use their instance of client application 104 to interact with the community hosting service 102. The client application 104 can make requests of the community hosting service 102 to initiate a session with the community hosting service 102 and to access servers and channels to which the user account is a member, receive notifications and send messages, and otherwise communicate in the channels in which they belong.

As illustrated in FIG. 1, community hosting service 102 provides a variety of services that can be called by client application 104 or other services of the community hosting service 102.

For example, the community hosting service 102 includes a servers/guilds service 124. The servers/guilds service 124, as described above, can be used to create and administer a server. Additionally, the servers/guilds service 124 can also support various functions to those user accounts that are members of a server. For example, when an instance of client application 104 establishes a session using sessions service 120, the sessions service 120 can interact with servers/guilds service 124 to provide information regarding the servers to which the user account belongs. The client application 104 can receive identifiers of all servers to which the user account operating the client device associated with client application 104 is a member. While the session is active, client application 104 can request updates regarding one or more of the servers to which the user account operating client application 104 belongs from servers/guilds service 124.

Community hosting service 102 also provides a safety/moderation service 116. As with any online community, community hosting service 102 occasionally needs to deal with user accounts issuing spam or inappropriate content. While administrators of servers can perform some moderation functions such as suspending user accounts on a particular server or banning user accounts or bots for inappropriate posts or for posting spam, community hosting service 102 can have various software services that attempt to moderate some posts. For example, safety/moderation service 116 can include algorithms designed to detect hate speech or other harmful or inappropriate content. Safety/moderation service 116 can also include algorithms configured to identify communications as spam or phishing. Safety/moderation service 116 can provide various functions to protect users from content posted in a channel and attacks on client application 104 or the computing device hosting client application 104.

Community hosting service 102 can also include a data analytics service 118. The data analytics service 118 can provide various services in support of community hosting service 102 and in support of the users of community hosting service 102. For example, data analytics service 118 can monitor the performance of various features of the community hosting service 102 to determine whether updates to features are well received by the user community. The data analytics service 118 can also be used to develop and run various machine learning algorithms and other algorithms designed to identify harmful content, malicious servers, malicious user accounts, and malicious bot.

As introduced above, sessions service 120 is configured to authenticate a user account to community hosting service 102. After a user account has been authenticated, the sessions service 120 can determine one or more servers to which the user account is a member or for which the user account is an administrator. The sessions service 120 can send a list of identifiers for the servers associated with the user account to the client application 104. Thereafter, the client application 104 can request information regarding the servers by using a session token that validates that the client application 104 is operating in an authenticated session.

The presence service 122 can be used to provide presence information regarding other members of a server or a channel to which the user account belongs. Through the presence service 122, the client application 104 can convey information about which user accounts are currently active in the server or channel. Likewise, the client application 104 can provide presence information for the user account controlling the instance of client application 104.

Community hosting service 102 can also include a real-time communications service 108. The real-time communications service 108 is configured to support real-time communications such as live voice communications or video conferencing. In some embodiments, the real-time communications service 108 can be a public Internet service located outside a gateway for community hosting service 102. Real-time communications service 108 can provide real-time communications for channels configured to support real-time communications.

FIG. 1 also illustrates a bot configuration service 126 for creating and/or configuring one or more bot 106. The bot configuration service 126 can provide tools and template configurations to configure bots to take on a variety or roles within a channel of a server. The bot 106 can be created and configured by users of the community hosting service 102 and linked to servers chosen by the administrator. In some embodiments, the bot 106 can be configured as a chatbot that can have some understanding of the human language through natural language processing technologies. The bot 106 can be configured to provide some content moderation functions and/or some administrative functions. For example, the bot 106 might be granted permission to invite new members, send messages in a channel, embed links, remove members, delete messages, mute members, and attach files, among other possible functions. In some embodiments, bot 106 can have their own user account and are authenticated using a token. Bot 106 can have full access to all services of community hosting service 102.

FIG. 1 also illustrates a topics generation service 128 for real-time topic extraction and summarization for communications channels and messaging platforms. The topics generation service 128 can use a language model to extracts topics from chat log data. A topic that is selected causes the conversation panel to jump to the start of the conversation associated with the selected topic. The messages that are associated with the selected topic may be highlighted or segregated from the rest of the messages. The selection of the topic and other types of engagement with topics may be stored to build up a database that is used for generating a personalized ranking of topics for respective users. The quality of the topics may be scored using a different language model. In some cases, the topics generation service 128 may be a part of or interfaces with the servers/guilds service 124.

While the community hosting service 102 is shown with just one of each service and database, it will be appreciated by those of ordinary skill in the art that community hosting service 102 can include many instances of each service or database, and in some embodiments, there can be different versions of the service or database that may utilize different technologies such as coding languages, database schemes, etc.

In some embodiments, the community hosting service 102 is configured such that the majority of communications between the community hosting service 102 and the client application 104 pass through API layer 110. The client application 104 can request responses from various services provided by the community hosting service 102 from the API layer 110. Additionally, services within the community hosting service 102 can communicate with each other by sending messages through the API layer 110. The client application 104 can also interact with a real-time communications service 108 for voice and video communication services. Although the community hosting service 102 is be described with respect to a particular system architecture and communication flow, it will be appreciated by those of ordinary skill in the art that other system configurations are possible.

FIG. 2A illustrates an example of user interface **200*a* presented by client application 104**.

User interface **200*a* includes icons for servers 202. The top icon has been selected and represents the "hydration club" server. The title 206 of the selected server, the "hydration club," is presented at the top of the user interface 200*a*. Options 212 include different messaging channels. For example, one channel, entitled "tea drinkers", may be a non-real-time messaging channel. The message thread within the "tea drinkers" channel can be shown within a panel 212. As illustrated in FIG. 2A, the panel 214 may be configured to present content such as text messages, images, emojis, recorded voice or video files, attachments, etc. A user can provide content to be included in the channel using input interface 208. The server 202 includes another channel entitled "sound of water" as further described in FIG. 2**B.

User interface **200*a* also includes a selectable option 204 to add additional servers. User interface 200*a* also includes a user account icon 210** and associated controls.

FIG. 2B illustrates another example of user interface **200*a* presented by client application 104. In FIG. 2B, option 212 entitled "sound of water" has been selected. The "sound of water" channel is a real-time communications channel. Accordingly, option 212 shows two user accounts engaged in real-time communications. As illustrated in FIG. 2B, the user account icon and associated controls show that the user account's microphone 216 is muted. Additionally, the user account has option 218 or option 220 to share their video or screen, respectively. The user account can also disconnect from the real-time communications using option 222**.

Figure 3:
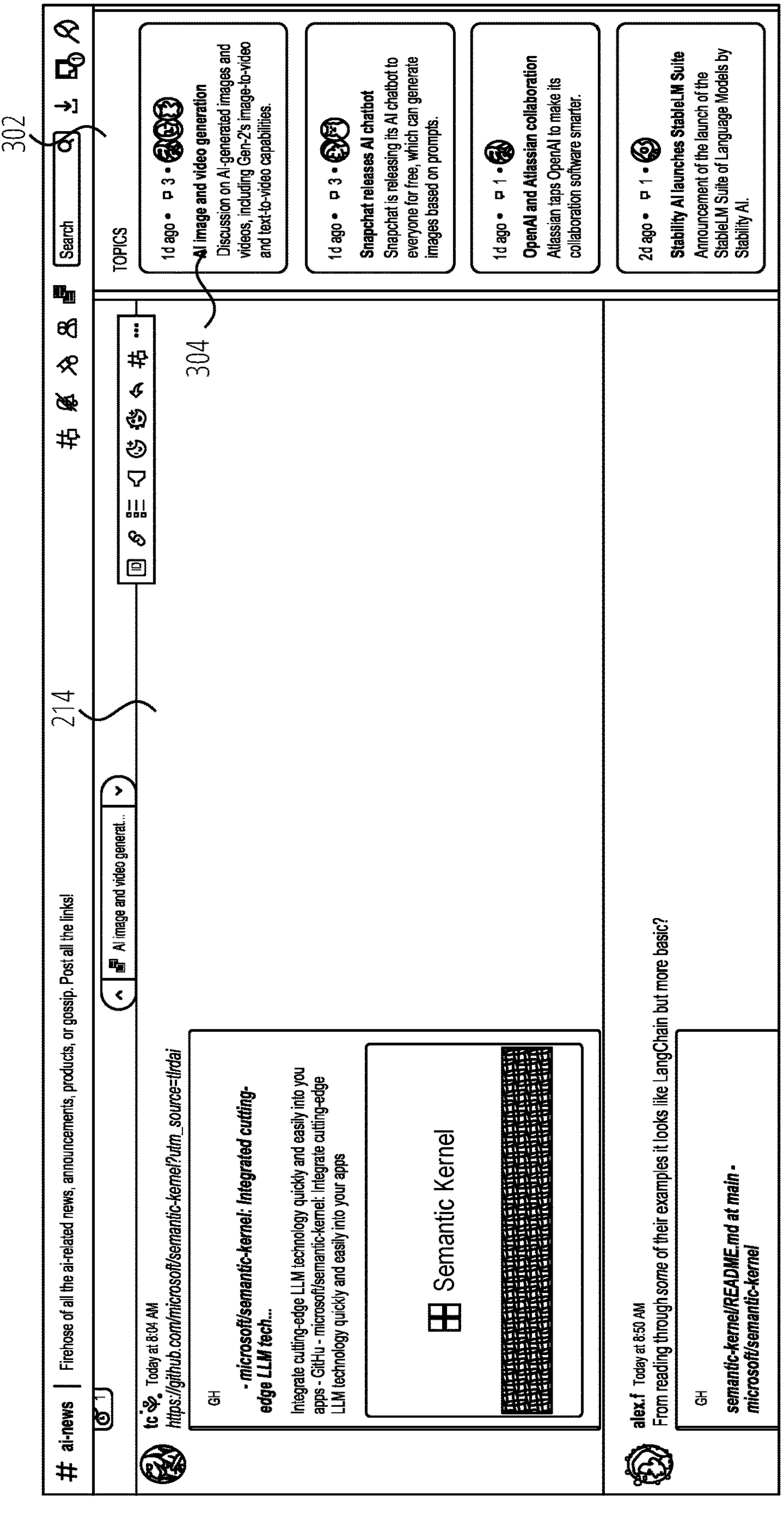
FIG. 3 illustrates an example of a user interface presented by a client application and includes topics and summaries of the topics alongside an associated channel in accordance with some aspects of the present technology.

FIG. 3 illustrates an example of a user interface 300 presented by a client application that includes topics and summaries of the topics alongside an associated channel in accordance with some aspects of the present technology.

The user interface 300 may include an interface of a messaging channel which may be presented in the panel 214. Additionally, the user interface 300 may include an interface for topics and summaries, which may be presented in a topics panel 302. In the topics panel 302, there may be a plurality of different selectable topics. The selectable topics, such as selectable topic 304, may also include a summary that provides slightly more detail. For example, as shown in FIG. 3, for a topic of "AI image and video generation" the summary may be "discussion on AI-generated images and videos, including Gen-Z's image-to-video and text-to-video capabilities. In some cases, the selectable topic 304 may be a card that includes other data such as when the selectable topic was created, how many messages are associated with the selectable topic, and how many and/or which users are involved in the conversation.

The selectable topics may automatically jump to a starting message associated with the selected topic in the panel 214.

In some cases, messages that are associated with the selected topic may be highlighted in some form.

FIG. 4 illustrates an example routine for generating topics based on chat log data in accordance with some aspects of the present technology. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

According to some examples, the method includes receiving a new message inputted in an interface of a messaging channel associated with a server that supports near real-time communications at block 402. For example, the servers/guilds service 124 and/or the community hosting service 102, illustrated in FIG. 1, may receive the new message. The new message may include text, images, video, or other types of content. The content of the message, the user that sent the message, a timestamp, and other types of metadata may be stored as chat log data.

According to some examples, the method includes bundling a latest dataset of chat log data including chat log data associated with the new message at block 404. The bundled latest dataset of chat log data may be associated with a plurality of consecutive messages. For example, the topics generation service 128 and/or the community hosting service 102, illustrated in FIG. 1, may bundle the latest dataset of chat log data.

In some cases, a same number of messages is used as a size of a training sample of a language model that is trained to receive chat log data. In some cases, before inputting the bundled dataset of chat log data, the chat log data needs to be converted into high quality conversation data by removing personally identifiable information and formatting metadata associated with usernames, images, and URLs.

According to some examples, the method includes inputting the bundled dataset of chat log data into a language model that outputs one or more topics associated with the inputted dataset of chat log data at block 406. For example, the topics generation service 128 and/or the community hosting service 102, illustrated in FIG. 1, may input the bundled dataset of chat log data into the language model. In some cases, the language model may be generative or autoregressive language model, that performs abstractive generation of the topics and summaries from chat log data. As mentioned above, the language model may be trained by a training set of labeled datasets of chat log data. In some cases, the labeled datasets of chat log data may be outputted by a different prompt-based language model. In some cases, loss values may be provided to the language model to output topics that are similar to the labeled datasets and discourage topics that are not similar to the labeled datasets. For example, each training set of labeled datasets may be 50 consecutive messages and once the language model is trained, the inputted chat log data may also be 50 consecutive messages. In some cases, the language model may further detect different conversations and respective topics that are interleaved in the chat log data.

In some cases, the language model may output, along with the topics, respective summaries and message identifiers that indicate which message are associated with the respective topic. The message identifiers may be used to highlight the messages associated with the topic. In some cases, the topics may be selectable and when selected, at the messaging channel interface, the messages may jump or scroll to a starting message associated with the selected topic. The messages that are associated with the topic may be highlighted by any means, e.g., highlighting, bolding, adding a line to the side of the message, or any other type of indication that differentiates the messages associated with the topic from other messages.

According to some examples, the method includes storing the one or more topics in association with the messaging channel at block 408. For example, the data service 112 and/or the community hosting service 102, illustrated in FIG. 1, may store the one or more topics. In some cases, the one or more topics may include respective summaries that provide slightly more detail than the topics as to what the associated conversations are discussing. The topics and summaries may also be stored in association with the user accounts that select the topics. For example, when a user selects the topics, a history of how the user interacts with topics may be saved. In other words, which topics users are engaged in may be saved into a database to generate personalization data, such as a personalized ranking of topics for respective users. For example, when a user selects a topic associated with movies or does not select certain topics that were provided in a push notification, such engagement is used to update a personalization ranking of topics. The personalization ranking of topics may first be based on which messaging channels the users are members of but may further be fine-tuned based on user engagement with the topics.

The personalization ranking of topics may further help provide personalization for suggesting new content. For example, a personalized push notification may be provided to a user based on personalized signals. Personalized signals may include a notification response history or a topic affinity. For example, if the user is likely to respond to push notifications the user may be provided with more push notifications and if the user has a topic of interest based on their history of searches or channel membership, all such signals may be used to generate a personalized push notification.

According to some examples, the method includes adding the one or more topics to a topic panel that is presented with the messaging channel interface at block 410. For example, the servers/guilds service 124 and/or the community hosting service 102, illustrated in FIG. 1, may add the one or more topics to the topics panel.

The one or more topics presented in the topics panel may be associated with the respective messaging channel. In some cases, when viewing a home page associated with the server that supports near real-time communications, a global set of topics associated with the channels that user is a member of may be visible, either in the topic panel or elsewhere on the page. In some cases, the global set of topics may include trending topics for other channels that the user is not a member of but could find interesting based on the personalization data.

In some cases, the one or more topics that may be evaluated may be considered a holdout test set and compared against a baseline set of a topic, associated summary, and message identifiers generated from inputting the bundled dataset of chat log data at a different prompt-based language model. There may be different metrics used to compare the two sets. A human evaluator may look at the quality of the topics and summaries and the correctness of the message identifiers and rate them. A heuristic-based metrics may determine if certain inappropriate words and may be compared to a restricted set of words or may compute message identifier correctness. In some cases, rouge scores (focuses on recall) and/or bleu scores (focuses on precision) may be used to rate text summarization, specifically as a natural language processing (NLP) evaluation.

A model-based metric may use a generative model to score the quality of the results. In some cases, the topic, associated summary, and message identifiers may be provided to a different prompt-based language model along with a baseline set of a topic, associated summary, and message identifiers generated from inputting the bundled dataset of chat log data at the different prompt-based language model or another prompt-based language model. The different prompt-based language model may be prompted to output a rating of the topic, associated summary, and message identifiers based on the baseline set. The rating may be an aggregate of specific ratings, such as a coherence rating, an accuracy rate, a rating for each message identifier regarding whether the respective message is discussing the topic, etc.

According to some examples, the method includes receiving one or more next messages in the messaging channel associated with the server that supports near real-time communication at block 412. For example, the servers/guilds service 124 and/or the community hosting service 102, illustrated in FIG. 1, may receive one or more next messages in the messaging channel. The one or more messages may come from the interface or from another device and/or other users.

According to some examples, the method includes bundling a next latest dataset of chat log data including chat log data associated with the one or more next messages and the new message at block 414. For example, the topics generation service 128 and/or the community hosting service 102, illustrated in FIG. 1, may bundle the next latest dataset of chat log data. As mentioned previously, segmented bundles of messages may be segment on a rolling basis, with overlapping portions of chat log data in each segmented bundle. The rolling basis or a sliding window of bundles of messages may help extract topics that span over different parts of the chat log data.

According to some examples, the method includes inputting the next bundled dataset of chat log data into the language model that outputs one or more next topics associated with the inputted dataset of chat log data at block 416. For example, the topics generation service 128 and/or the community hosting service 102, illustrated in FIG. 1, may input the next bundled dataset of chat log data. Since there is an overlap of chat log data, there may be duplicate topics that are generated by the language model. As such, in order to build a low latency and high-quality system for the real-time topic and summary extraction, with new incoming messages having overlapping topics, there needs to be a means to deduplicated or aggregated to give a smooth user experience.

According to some examples, the method includes deduplicating or aggregating overlapping topics of the one or more next topics, the one or more topics, and other stored topics at block 418. For example, the topics generation service 128 and/or the community hosting service 102, illustrated in FIG. 1, may deduplicate or aggregate overlapping topics. For example, a user's home page should be shown minimal duplicated topics as chat is being processed in real-time. As such, topics may be generated based on a sliding window of bundles of messages while prompt-based models may be used to filter out duplicates or perform a high-level clustering of similar sounding topics.

Figure 5:
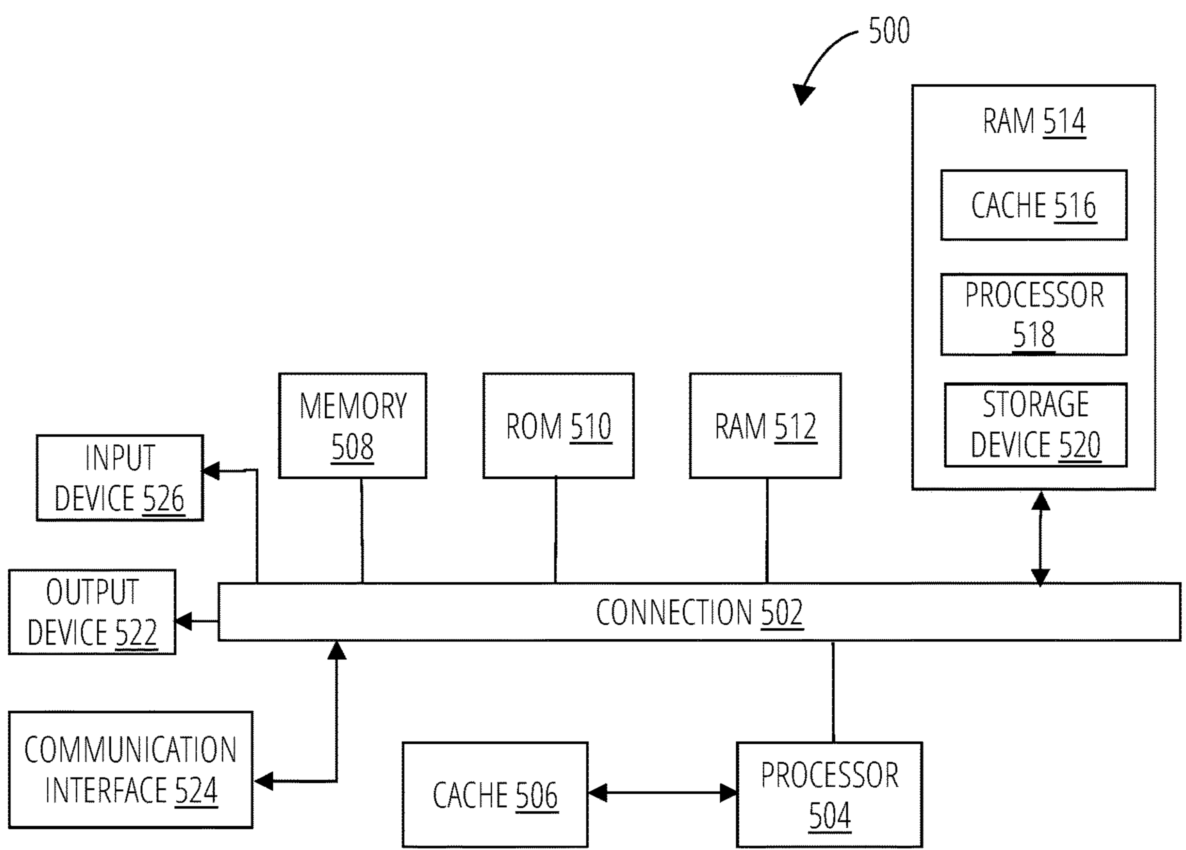
FIG. 5 illustrates an example of a computing system for implementing some aspects of the present technology.

FIG. 5 shows an example of computing system 500, which can be for example any computing device making up client application 104, community hosting service 102, or any component thereof in which the components of the system are in communication with each other using connection 502. Connection 502 can be a physical connection via a bus, or a direct connection into processor 504, such as in a chipset architecture. Connection 502 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 500 includes at least one processing unit (CPU or processor) 504 and connection 502 that couples various system components including system memory 508, such as read-only memory (ROM) 510 and random access memory (RAM) 512 to processor 504. Computing system 500 can include a cache 506 of high-speed memory connected directly with, in close proximity to, or integrated as part of processor 504.

Processor 504 can include any general-purpose processor and a hardware service or software service stored in storage device 520, configured to control processor 504 as well as a special-purpose processor where software instructions are incorporated into the actual processor design. Processor 504 may essentially be a completely self-contained computing system, containing multiple cores or processors, a bus, memory controller, cache, etc. A multi-core processor may be symmetric or asymmetric.

To enable user interaction, computing system 500 includes an input device 526, which can represent any number of input mechanisms, such as a microphone for speech, a touch-sensitive screen for gesture or graphical input, keyboard, mouse, motion input, speech, etc. Computing system 500 can also include output device 522, which can be one or more of a number of output mechanisms known to those of skill in the art. In some instances, multimodal systems can enable a user to provide multiple types of input/output to communicate with computing system 500. Computing system 500 can include communication interface 524, which can generally govern and manage the user input and system output. There is no restriction on operating on any particular hardware arrangement, and therefore the basic features here may easily be substituted for improved hardware or firmware arrangements as they are developed.

Storage device 520 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 520 can include software services, servers, services, etc., that when the code that defines such software is executed by the processor 504, it causes the system to perform a function. In some embodiments, a hardware service that performs a particular function can include the software component stored in a computer-readable medium in connection with the necessary hardware components, such as processor 504, connection 502, output device 522, etc., to carry out the function.

Figure 6:
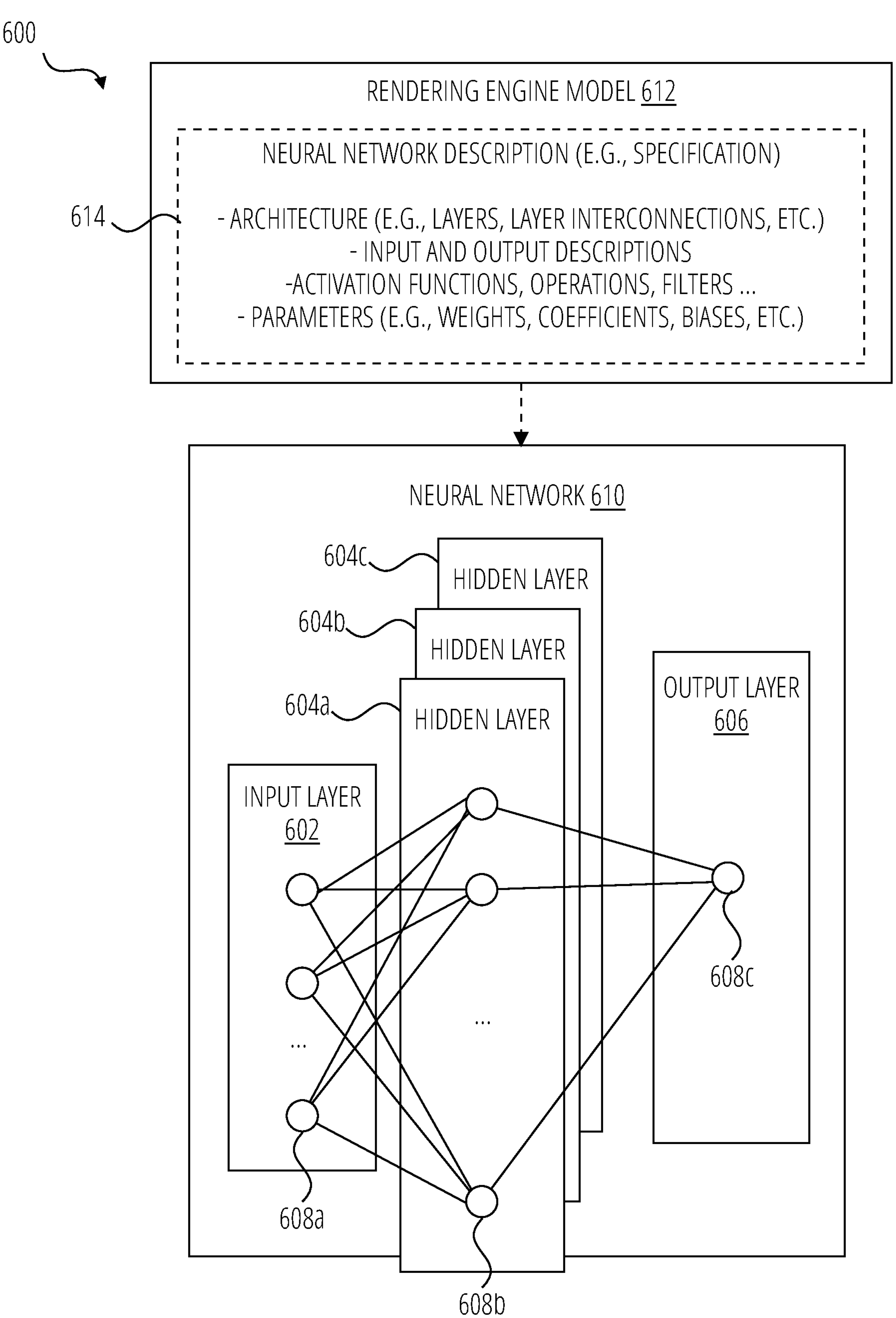
FIG. 6 illustrates an example neural network architecture in accordance with some aspects of the present technology.

FIG. 6 illustrates an example neural network architecture, according to one aspect of the present disclosure. Architecture 600 includes a neural network 610 defined by an example neural network description 614 in node 608*c* (neural controller). The neural network 6100 can represent a neural network implementation of a rendering engine for rendering media data. The neural network description 614 can include a full specification of the neural network 610, including the neural network architecture 600. For example, the neural network description 614 can include a description or specification of the architecture 600 of the neural network 610 (e.g., the layers, layer interconnections, number of nodes in each layer, etc.); an input and output description which indicates how the input and output are formed or processed; an indication of the activation functions in the neural network, the operations or filters in the neural network, etc.; neural network parameters such as weights, biases, etc.; and so forth.

The neural network 610 reflects the architecture 600 defined in the input layer 602. In this example, the neural network 610 includes an input layer 602, which includes input data, such as bundled dataset of chat log data. In one illustrative example, the input layer 602 can include data representing a portion of the input media data such as a patch of data or pixels (e.g., a 728×728 patch of data) in an image corresponding to the input media data (e.g., that of user 702 and/or selected product(s) 708).

The neural network 610 includes hidden layers 604*a* through 604 N (collectively "604" hereinafter). The hidden layers 604 can include n number of hidden layers, where n is an integer greater than or equal to one. The number of hidden layers can include as many layers as needed for a desired processing outcome and/or rendering intent. The neural network 610 further includes an output layer 606 that provides an output (e.g., rendering output) resulting from the processing performed by the hidden layers 604. In one illustrative example, the output layer 606 can provide summaries, message identifiers, and topics.

The neural network 610 in this example is a multi-layer neural network of interconnected nodes. Each node can represent a piece of information. Information associated with the nodes is shared among the different layers and each layer retains information as information is processed. In some cases, the neural network 610 can include a feed-forward neural network, in which case there are no feedback connections where outputs of the neural network are fed back into itself. In other cases, the neural network 610 can include a recurrent neural network, which can have loops that allow information to be carried across nodes while reading in input.

Information can be exchanged between nodes through node-to-node interconnections between the various layers. Nodes of the input layer 602 can activate a set of nodes in the first hidden layer 604*a*. For example, as shown, each of the input nodes of the input layer 602 is connected to each of the nodes of the first hidden layer 604*a*. The nodes of the hidden layers hidden layer 604*a* can transform the information of each input node by applying activation functions to the information. The information derived from the transformation can then be passed to and can activate the nodes of the next hidden layer (e.g., 604*b*), which can perform their own designated functions. Example functions include convolutional, up-sampling, data transformation, pooling, and/or any other suitable functions. The output of the hidden layer (e.g., 604*b*) can then activate nodes of the next hidden layer (e.g., 604N), and so on. The output of the last hidden layer can activate one or more nodes of the output layer 706, at which point an output is provided. In some cases, while nodes (e.g., nodes 608*a*, 608*b*, 608*c*) in the neural network 610 are shown as having multiple output lines, a node has a single output and all lines shown as being output from a node represent the same output value.

In some cases, each node or interconnection between nodes can have a weight that is a set of parameters derived from training the neural network 610. For example, an interconnection between nodes can represent a piece of information learned about the interconnected nodes. The interconnection can have a numeric weight that can be tuned (e.g., based on a training dataset), allowing the neural network 610 to be adaptive to inputs and able to learn as more data is processed.

The neural network 610 can be pre-trained to process the features from the data in the input layer 602 using the different hidden layers 604 in order to provide the output through the output layer 606. In an example in which the neural network 610 is used to identify topics, message identifiers, and summaries, the neural network 610 can be trained using training data that includes example topics, summaries, chat log data, and message identifiers. For instance, training images can be input into the neural network 610, which can be processed by the neural network 610 to generate outputs which can be used to tune one or more aspects of the neural network 610, such as weights, biases, etc.

In some cases, the neural network 610 can adjust weights of nodes using a training process called backpropagation. Backpropagation can include a forward pass, a loss function, a backward pass, and a weight update. The forward pass, loss function, backward pass, and parameter update is performed for one training iteration. The process can be repeated for a certain number of iterations for each set of training media data until the weights of the layers are accurately tuned.

For a first training iteration for the neural network 610, the output can include values that do not give preference to any particular class due to the weights being randomly selected at initialization. For example, if the output is a vector with probabilities that the object includes different product(s) and/or different users, the probability value for each of the different product and/or user may be equal or at least very similar (e.g., for ten possible products or users, each class may have a probability value of 0.1). With the initial weights, the neural network 610 is unable to determine low level features and thus cannot make an accurate determination of what the classification of the object might be. A loss function can be used to analyze errors in the output. Any suitable loss function definition can be used.

The loss (or error) can be high for the first training dataset (e.g., images) since the actual values will be different than the predicted output. The goal of training is to minimize the amount of loss so that the predicted output comports with a target or ideal output. The neural network 610 can perform a backward pass by determining which inputs (weights) most contributed to the loss of the neural network 610, and can adjust the weights so that the loss decreases and is eventually minimized.

A derivative of the loss with respect to the weights can be computed to determine the weights that contributed most to the loss of the neural network 610. After the derivative is computed, a weight update can be performed by updating the weights of the filters. For example, the weights can be updated so that they change in the opposite direction of the gradient. A learning rate can be set to any suitable value, with a high learning rate including larger weight updates and a lower value indicating smaller weight updates.

The neural network 610 can include any suitable neural or deep learning network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. In other examples, the neural network 610 can represent any other neural or deep learning network, such as an autoencoder, a deep belief nets (DBNs), a recurrent neural networks (RNNs), etc.

For clarity of explanation, in some instances, the present technology may be presented as including individual functional blocks including functional blocks comprising devices, device components, workflow steps or routines in a method embodied in software, or combinations of hardware and software.

Any of the workflow steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method workflow steps, it is to be understood that the subject matter defined in the appended claims is not necessarily limited to these described features or acts. For example, such functionality can be distributed differently or performed in components other than those identified herein. Rather, the described features and workflow steps are disclosed as examples of components of systems and methods within the scope of the appended claims.

What is claimed is:

1. A computer-implemented method comprising:

receiving a new message inputted in a messaging channel associated with a server that supports near real-time communications;

bundling, responsive to receipt of the new message, a latest dataset of chat log data, wherein a bundled dataset includes chat log data associated with consecutive most-recent messages ending with the new message;

inputting the bundled dataset of chat log data into a language model that outputs one or more topics associated with the bundled dataset of the chat log data and further outputs, as part of an output of the language model, message identifiers indicating which messages, of the consecutive most-recent messages, are associated with at least one of the one or more topics;

storing the one or more topics in association with the messaging channel, wherein storing includes storing message identifiers output by the language model in association with a respective topic;

adding the one or more topics to a topic panel that is presented in a graphical user interface with the messaging channel;

receiving, by the graphical user interface, a selection of a topic stored with the message identifiers output by the language model in the topic panel to yield a selected topic; and automatically jumping, by the graphical user interface, to a starting message in the messaging channel identified by a respective message identifier from the message identifiers output by the language model and stored in association with the selected topic in the messaging channel.

2. The computer-implemented method of claim 1, further comprising:

highlighting messages associated with the selected topic in the messaging channel.

3. The computer-implemented method of claim 2, further comprising:

outputting, from the language model, summaries associated with the one or more topics, wherein the highlighted messages are associated with the message identifiers.

4. The computer-implemented method of claim 1, further comprising:

receiving one or more next messages in the messaging channel associated with the server that supports the near real-time communications;

bundling a next latest dataset of chat log data including chat log data associated with the one or more next message and the new message and consecutive most-recent messages up to a limit into a next bundled dataset, wherein the bundled dataset and next bundled dataset make up a sliding window of consecutive most-recent messages;

inputting the next bundled dataset of chat log data into the language model that outputs one or more next topics associated with the inputted dataset of chat log data; and deduplicating or aggregating overlapping topics of the one or more next topics, the one or more topics, and other stored topics.

5. The computer-implemented method of claim 1, further comprising:

providing a personalized push notification to a user based on personalized signals including at least one of: a notification response history or a topic affinity, wherein the personalized push notification includes a recent one or more selectable topics that brings the user to respective messages in a respective messaging channel.

6. The computer-implemented method of claim 1, further comprising:

converting the chat log data into high quality conversation data by removing personally identifiable information and formatting metadata associated with usernames, images, and URLs.

7. The computer-implemented method of claim 1, further comprising:

causing to display a limited set of topics associated with a conversation that is presented with the messaging channel;

receiving a selection to view a home page associated with the server that supports the near real-time communications; and causing to display a global set of topics associated with channels that a user is a member of.

8. The computer-implemented method of claim 1, wherein the language model detects different conversations and respective topics that are interleaved in conversation data.

9. The computer-implemented method of claim 1, further comprising:

receiving an evaluation of the one or more topics from the language model based on one or more topics that were outputted by a different prompt-based language model for the bundled dataset of chat log data.

10. The computer-implemented method of claim 1, further comprising:

saving which topics users are engaging in and building up a database for generating a personalized ranking of topics for respective users.

11. The computer-implemented method of claim 1 further comprising:

inputting a training set of labeled datasets of chat log data into the language model, wherein the labeled datasets of chat log data is outputted by a different prompt-based language model; and providing loss values to the language model to encourage the language model to output topics that are similar to the labeled datasets and discourage topics that are not similar to the labeled datasets.

12. The computer-implemented method of claim 1, wherein the bundled latest dataset of chat log data associated with a plurality of consecutive messages to be inputted into the language model.

13. The computer-implemented method of claim 1, further comprising:

providing the topic, associated summary, and the message identifiers to a different prompt-based language model along with a baseline set of a topic, associated summary, and message identifiers generated from inputting the bundled dataset of chat log data at the different prompt-based language model or another prompt-based language model, wherein the different prompt-based language model is prompted to output a rating of the topic, associated summary, and message identifiers based on the baseline set.

14. A system comprising:

a processor; and a memory storing instructions that, when executed by the processor, configure the system to:

receive a new message inputted in an interface of a messaging channel associated with a server that supports near real-time communications;

bundle, responsive to receipt of the new message, a latest dataset of chat log data, wherein a bundled dataset includes chat log data associated with consecutive most-recent messages ending with the new message;

input the bundled dataset of chat log data into a language model that outputs one or more topics associated with the inputted dataset of chat log data and further outputs, as part of an output of the language model, message identifiers indicating which messages, of the consecutive most-recent messages, are associated with at least one of the one or more topics;

store the one or more topics in association with the messaging channel, wherein storing includes storing message identifiers output by the language model in association with a respective topic;

add the one or more topics to a topic panel that is presented in a graphical user interface with the messaging channel;

receiving, by the graphical user interface, a selection of a topic stored with the message identifiers output by the language model in the topic panel to yield a selected topic; and automatically jumping, by the graphical user interface, to a starting message in the messaging channel identified by a respective message from the message identifiers output by the language model and stored in association with the selected topic in the messaging channel.

15. The system of claim 14, wherein the instructions further configure the system to:

highlight messages associated with the selected topic in the messaging channel.

16. The system of claim 15, wherein the instructions further configure the system to:

outputting, from the language model, summaries associated with the one or more topics, wherein the highlighted messages are associated with the message identifiers.

17. The system of claim 14, wherein the instructions further configure the system to:

cause to display a limited set of topics associated with a conversation that is presented with the messaging channel interface;

receive a selection to view a home page associated with the server that supports near real-time communications; and cause to display a global set of topics associated with channels that a user is a member of.

18. A non-transitory computer-readable storage medium including instructions that when executed by a computer, cause the computer to:

receive a new message inputted in an interface of a messaging channel associated with a server that supports near real-time communications;

bundle, responsive to receipt of the new message, a latest dataset of chat log data, wherein a bundled dataset includes chat log data associated with consecutive most-recent messages ending with the new message;

input the bundled dataset of chat log data into a language model that outputs one or more topics associated with the inputted dataset of chat log data and further outputs, as part of an output of the language model, message identifiers indicating which messages, of the consecutive most-recent messages, are associated with at least one of the one or more topics;

store the one or more topics in association with the messaging channel, wherein storing includes storing message identifiers output by the language model in association with a respective topic;

add the one or more topics to a topic panel that is presented in a graphical user interface with the messaging channel;

receiving, by the graphical user interface, a selection of a topic stored with the message identifiers output by the language model in the topic panel to yield a selected topic; and automatically jumping, by the graphical user interface, to a starting message in the messaging channel identified by a respective message identifier from the message identifiers output by the language model and stored in association with the selected topic in the messaging channel.

* * * * *